April 4, 1967 C. L. VOGT 3,312,431
CRASH-ACTUATED CLOSURE VALVE
Filed Aug. 3, 1959 3 Sheets-Sheet 1
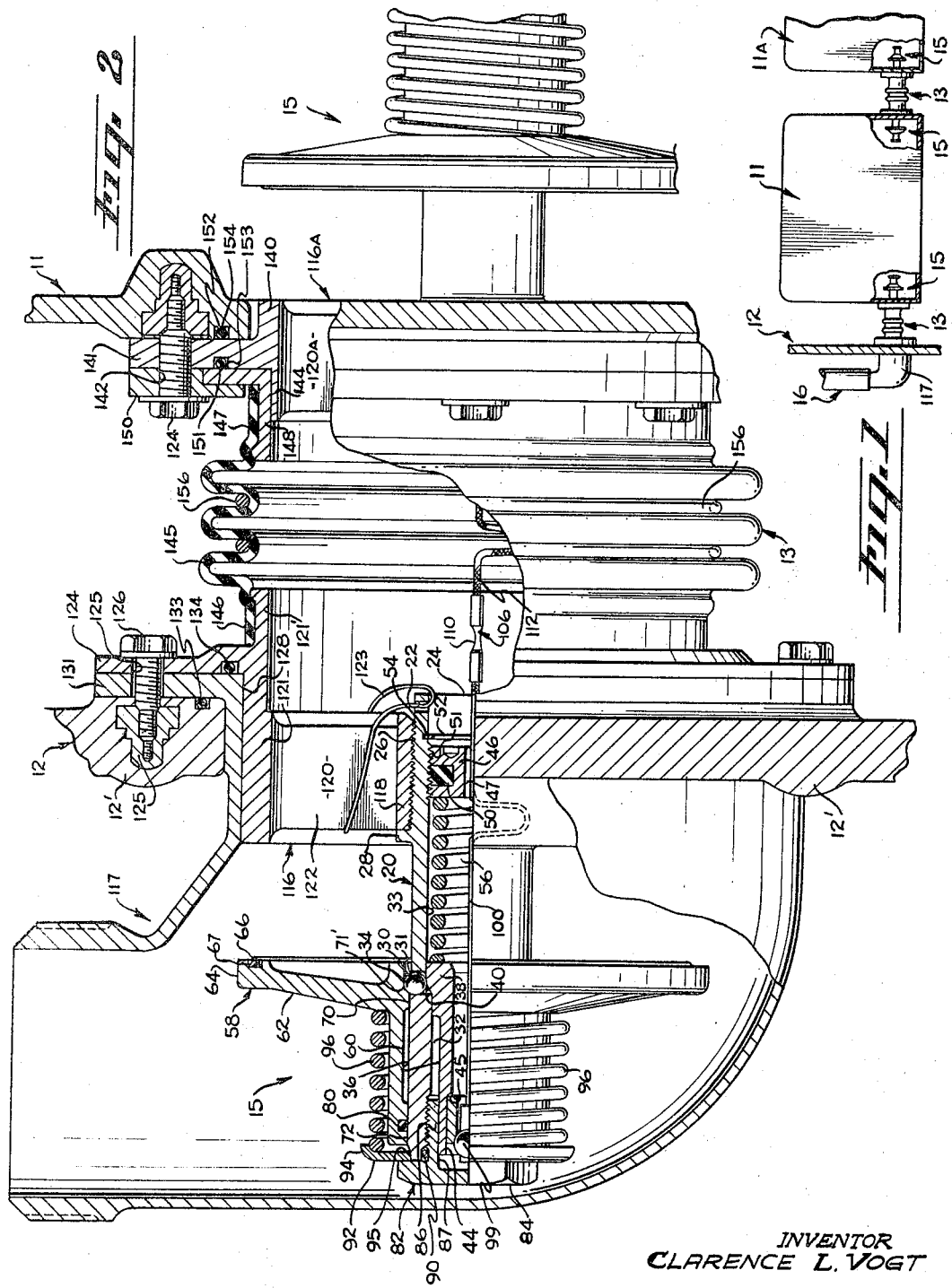
INVENTOR
CLARENCE L. VOGT
BY
ATTORNEYS

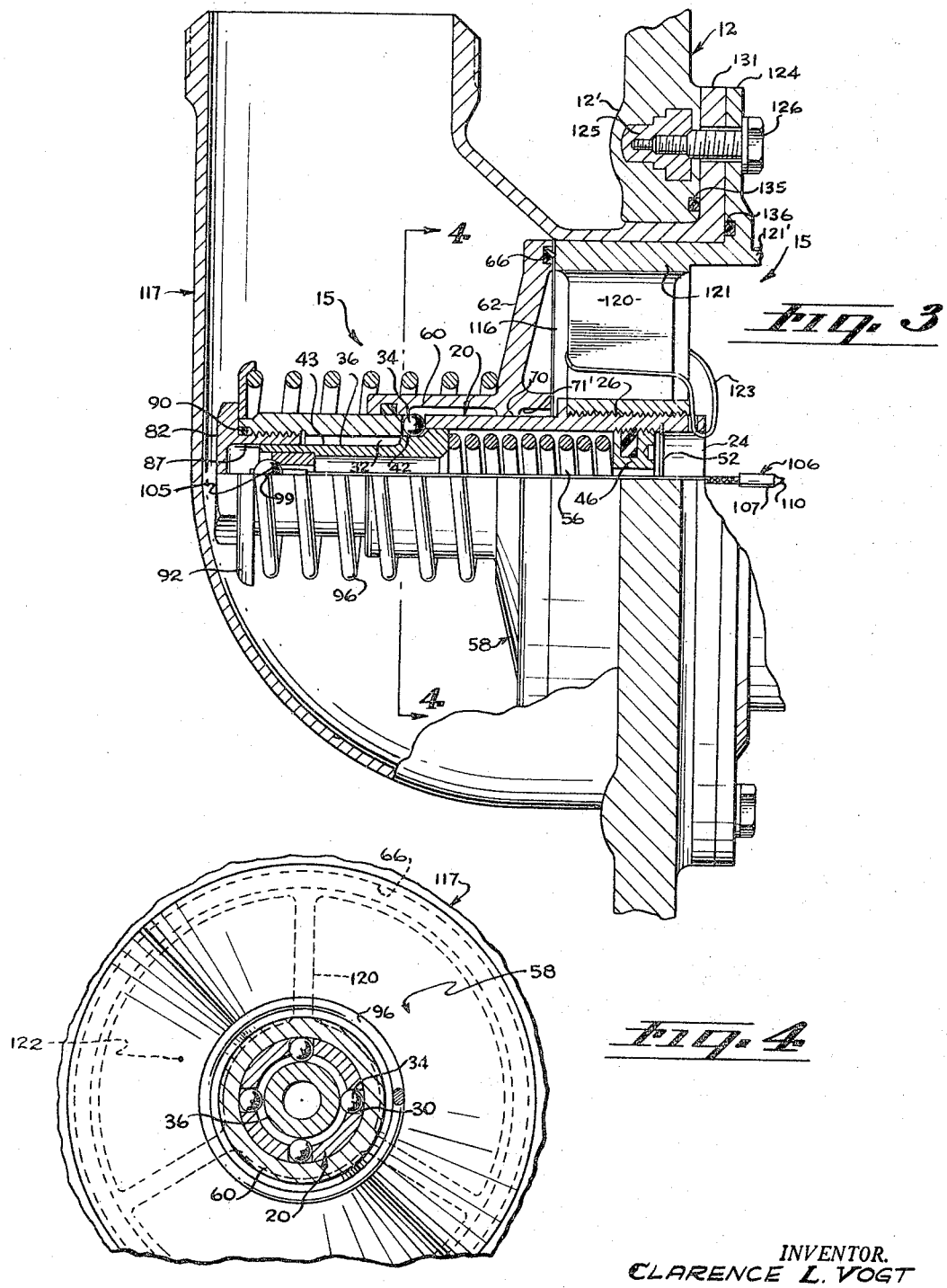

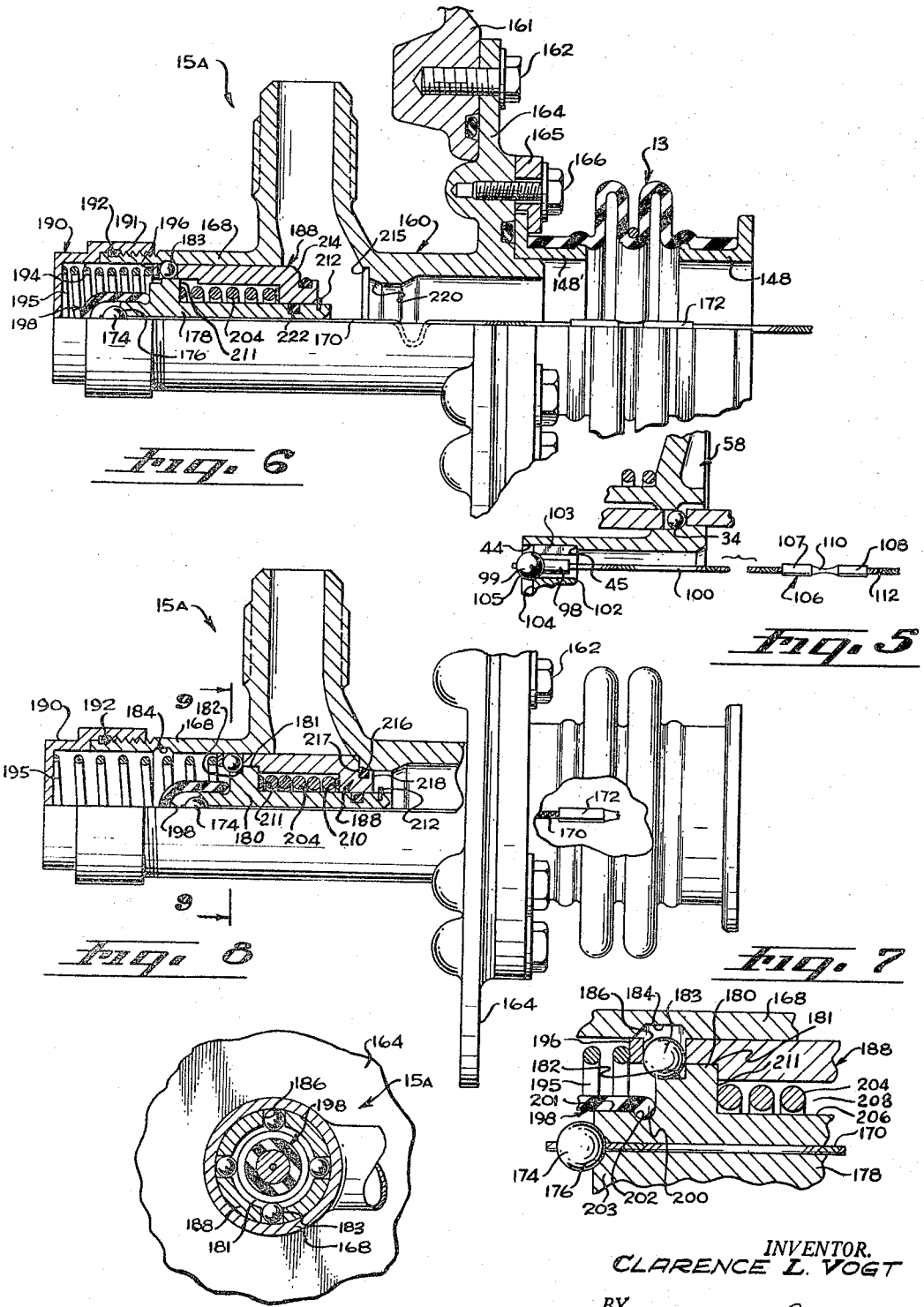

United States Patent Office 3,312,431
Patented Apr. 4, 1967

3,312,431
CRASH-ACTUATED CLOSURE VALVE
Clarence L. Vogt, Burbank, Calif., assignor, by mesne assignments, to the United States of America as represented by the Secretary of the Army
Filed Aug. 3, 1959, Ser. No. 831,426
12 Claims. (Cl. 244—135)

This invention relates to valve assemblies of the type normally held open but which are adapted, as a safety precaution, to be automatically closed upon abnormal displacement of the structure on which they are mounted, such as a fuel tank. In aircraft, for example, the fuel may be contained in a series of connected cells or tanks. In the event of a crash or other abnormal occurence which greatly displaces parts of the aircraft in relation to each other, such relative movement, if it occurred to tanks or conduits equipped with the present valve assemblies would seal each tank, thereby preventing escape of the fuel and minimizing the consequent fire and explosion hazard which might ensue. Thus it is an object of the present invention to provide novel and improved crash-actuated closure valves.

Another purpose is to provide associated severable coupling conduits between such valves and the tanks or cells in which they are mounted designed to separate only after closing of said valves and further adapted to allow normal incidental displacement of the connected tanks without severance.

Still another object resides in the provision of breakaway cable means for actuating the seating mechanism of such valves, and of means for individually balancing the required valve seating force in each valve assembly in relation to the necessary breakaway tension of the connected cable. Such actuating cables may be disposed within my coupling conduits which connect successive fuel tanks, or alternately the free end of a valve-connected cable may be secured to any supporting structure. In addition, of course, the cable may be manually operated, if desired, when the necessary operating tension is set low enough and it is located in a position accessible to the operator. In such event it may provide a remotely-operable safety device for use in process industries employing dangerous ingredients.

Still another advantage resides in a construction for seating such valve by axially directed pressure externally applied without rotary operating handles or the like.

Other objects and advantages of the invention will be apparent from the following description and claims, the novelty consisting in the features of construction, combination of parts, the unique relations of the members and the relative proportioning, disposition, and operation thereof, all as more completely outlined herein and particularly pointed out in the appended claims.

In the drawings, which form part of the present specification:

FIG. 1 is a fragmentary sectional elevational view of two fuel cells or tanks, a structural wall and conduit connections between the tanks and beyond one tank, illustrating typical locations for my valves;

FIG. 2 is a medial sectional view taken through my valve assembly in normal, locked-open position with portions shown in elevation;

FIG. 3 is a fragmentary sectional view similar to FIG. 2 but showing the valve closed;

FIG. 4 is a sectional view on line 4—4 of FIG. 3, particularly showing the locking detent balls in release position;

FIG. 5 shows an operational detail, somewhat diagrammatically, in section, with the locking detent balls seen in unseated position;

FIG. 6 is a medial sectional view through a modified form of my valve assembly, partly in elevation, showing the valve in open position;

FIG. 7 is a fragmentary enlarged detail view of a portion of the locking detent mechanism in unseated position;

FIG. 8 is a view similar to FIG. 6 but showing the valve closed; and

FIG. 9 is a sectional view on line 9—9 of FIG. 8 showing the disengaged position of the detent balls.

More particularly describing the invention, referring first to FIG. 1, 11 and 11A designate fuel cells or tanks such as might be disposed in the wing of an aircraft and 12 designates a structural wall or other element of the aircraft. A conduit 13 is shown connecting the cells and another is shown between cell 11 and element 12. Mounted in each cell is a normally open valve assembly 15 embodying the invention and a similar valve assembly 15 is shown mounted on the wall or element 12 controlling a conduit 16 which may lead to the ultimate destination of the fuel.

In the event of the aircraft crashing or other event occurring which would cause sufficient movement of the fuel cells relative to each other to disrupt a conduit 13, the valves 15 associated therewith close to seal off the escape of fuel.

Referring now to FIGS. 2-5, and particularly to the valve assembly 15 mounted on element 12, there is provided an inner, generally tubular body 20 formed with a peripheral series of circumferentially spaced holes 22 adjacent the end 24. Spaced axially therefrom is an externally threaded section 26 terminating in a peripheral flange 28 for mounting the body as will be described later. Intermediate its ends the body is provided with a series of equally circumeferentially spaced radial apertures 30 located immediately adjacent an inwardly projecting annular abutment shoulder 31 which thus defines a radially restricted chamber portion 32 beyond a chamber portion 33. Each aperture has a detent ball 34 therein of slightly greater diameter than the radial thickness of the body wall. The balls are intended to function to hold or lock the valve in an open position when held outwardly. When released, the balls permit the valve to close, as will later appear.

Longitudinally slidable within body 20 is a generally cylindrical plunger 36 formed with an enlarged annular head section 38 of circumference generally aproximating that of the interior of chamber 33 and tapering at 40 to a radially restricted step 42 of a diameter such as to be received in chamber 32. Beyond step 42 the plunger is again radially restricted to form a reduced section 43, the outer face of which is spaced inward from the adjacent inner wall of the body 20. A counterbore 44 is provided in the end of the section 43 and this terminates in a shoulder 45.

An adjuster ring 46 is threaded mounted in the inner end of the body 20. The ring has a radial bore 47 which receives a nylon plug 50, the latter serving to frictionally engage the adjacent inner threads 51 of the body, so as to retain the adjuster ring 46 in adjusted position. A conventional snap ring 52 is retained in a corresponding inner groove 54 of the housing so as to prevent accidental withdrawal of the adjuster ring therebeyond.

A compression coil spring 56 is disposed within body 20 between the inner face of the adjuster ring 46 and the forward end of plunger 36 so as normally to hold the latter in seated position, that is, with its head 38 in registration with the detent balls 34 so as to maintain the latter in outwardly projected position. Accordingly, it will be seen that the force of the spring 56 against the plunger 36 (the force which holds the valve open and which must be overcome in order to seat it, as will later appear) may be varied by means of the adjuster ring 46 which bears against the other end of spring 56.

Slidably mounted about the body 20 is a valve closure member 58 formed with a tubular body section 60 and an outwardly projecting flange or closure disk 62, the outer annulus 64 of which is provided with a sealing ring 66 in a groove 67 in its forward face. Internally the valve closure is provided with an inwardly projecting land 70 adapted to rest against each of the (four) outwardly-projecting detent balls 34, the end surface 71' of the land being curved as shown for the purpose. A second inner, annular land 72 is provided at the other end of the body of the valve closure member and this is grooved to accommodate an O ring seal 80.

A cap nut 82 serves to close the end of the valve body 20, being formed with a terminal flange section 84 and a threaded annulus 86. The cap threads into body 20 and has a smooth, cylindrical inner surface 87 to slidably receive the end portion of the plunger. A sealing O ring 90 is lodged in the outer crotch between the cap and body 20. Externally, a washer 92 having a peripheral, forwardly curved rim or lip 94 is disposed about a reduced surface 95 of the body 20 between the cap and a coil compression spring 96 which is mounted about the section 60 of the valve closure. The other end of the spring bears against the base of the disk 62 so as to yieldably urge the same to closed position upon retraction of the balls 34.

Within the counterbored section 44 of the plunger, I locate a release assembly (see FIG. 5) including a cable anchor or cable end which includes a cylindrical cable section 98 and a spherical ball 99 in which an end of a cable 100 is firmly mounted. A cylindrical seating collar 102, having an axial slot 103 to insert the cable is slidably received in the counterbore 44 of the plunger and abuts shoulder 45. The end face 104 of collar 102 is dished or concavely shaped so as to form a socket 105 to seat the sphere 99 thereagainst and the cylindrical portion 98 is received within the collar. The actuating cable 100 thus extends through the whole length of the body 20 to the exterior where it is coupled to a metal breakaway member 106. The latter, which may be formed of corrosion resistant metal alloy, is essentially a frangible link formed as a pair of oppositely oriented, elongated open-ended sockets 107, 108 joined together at their closed ends by a medial, restricted neck portion 110. The cable 100 is swaged in socket 107 and a cable 112 swaged in the other socket. The neck portion 110 is intended to be severable at a predetermined pull greater than the force needed to pull the cable and attached ball 99 so as to unseat the plunger 36 against the seating force of the spring 56, the tension of which is adjusted by means of the adjustment ring 46. Cable 112 extends to a similar valve assembly 15 disposed within the tank or cell 11.

For the purpose of mounting the valve assembly 15 in the wall 12 or the like I provide an adapter mounting flange 116 which is designed for use in conjunction with an elbow fitting 117. Where no elbow is used, as is more usually the case, as where a valve assembly 15 is mounted in the wall of a fuel tank 11 as shown at the right hand side of FIG. 2, I provide a standard mounting flange 116A.

Flange 116 includes an internally threaded hub 118 which receives the valve body 20 in abutment with shoulder 28 thereof. A plurality of spokes or webs 120 (shown as three) connect the hub with an annular rim 121 and define fluid ports 122 therebetween. A safety wire 123 can be fastened about one of the spokes and passed through a hole 22 in the end of the valve body. The rim 121 has a flange 124 provided with a circumferential series of apertures 125 to receive mounting screws 126 which are threadedly mounted in inserts 125 in a mounting ring portion 12' of wall 12. The elbow 117 is provided with a cylindrical inner surface 128 to receive rim 121 of member 116. A radial flange 131 on the elbow is mounted between flange 124 and section 12' of wall 12. Seal rings 133 and 134 are provided in grooves 135 and 136.

The rim 121 of member 116 has an extension 121' beyond flange 122 for mounting one end of the flexible conduit member 13 used for coupling together adjacent containers such as the cells 11, 11A or a cell 11 and the elbow 117 of a conduit 16.

Referring now, however, to the mounting flange 116A, this has a plurality of spokes or webs 120A which extend outwardly from a central internally threaded hub (not shown) in all respects the same as hub 118 of member 116. Member 116A includes a rim 140 and a radial flange 141 which is provided with a series of apertures 142 to receive mounting screws 124. The rim 140 is provided with a cylindrical outer surface 144 for the purpose of mounting member 13 as will be described.

Referring now to the flexible conduit 13, this may be made of a suitable rubber-like material which is inert to the fluids to be carried and includes a generally tubular bellows section 145 and two end sections 146 and 147. End section 147 is bonded to a mounting ring 148 of angular cross section. The latter is secured against the flange 141 of element 116A by a split ring 150 and screws 124. Seal rings 151 and 152 in grooves 153 and 154 are provided as shown. Where the conduit 13 is provided between standard fittings 116A, such as is more often the case, each end of the conduit may be provided with a mounting ring 148 of metal bonded thereto. However, where the conduit is used in conjunction with a mounting flange 116 as shown in FIG. 2, end 147 of the conduit is bonded or otherwise secured to the outer surface of the rim portion 121' as shown.

In order to stiffen the conduit 13 somewhat and enable it to retain its shape under normal conditions, one or more metal rings 156 may be placed in encircling relation to the conduit, as shown. It will be apparent that the conduit is extremely flexible which is advantageous at the time of installation and subsequently in the event of relative movement between the connected cells.

Conduit 13 is severable through the intermediate or bellows section 145 in the event of sufficient relative displacement of the two tanks or other members between which it extends, however, due to the axial expansibility of the conduit, the valves 15 will have already been closed by tensioning of the cable means extending between them, thus preventing loss of liquid from the tanks (or tank and conduit). Thus, upon the cable being stretched taut, a pull for example of one hundred pounds thereon, will seat the valve or valves to which it is attached. The slack in the cable will be taken up before the bellows is completely extended and the frangible link 110 will break at, say, five hundred pounds tension.

To recapitulate, the valves 15 are normally held open as shown in FIG. 2. Upon a substantial relative movement of the cells 11, 11A, or cell 11 and wall 12, the cable means extending between the valves tightens and in each valve the plunger 36 is pulled against its spring 56 permitting detent balls 34 to move inwardly and release the valve closure member 58 which is moved to closed position by spring 96. Subsequently the cable means breaks and still later the flexible conduit 13 ruptures. In the event it is desired to dispense with the valve 15 mounted on wall 12, the cable 100 may be attached to the elbow 117 for the purpose of actuating the valve 15 in cell 11.

Referring now to the modified or alternate valve assembly 15A shown in FIGS. 6–9, this may be mounted within a fluid cell or coupled to a conduit line. In either event the tubular body 160 is secured directly to the cell wall or other structure 161 by screws 162 which extend through an attachment flange 164. A flexible conduit 13 is in turn attached to the valve body by means of a mounting ring 148' on one end thereof which is secured by a split ring 165 held by the screws 166.

The valve body has a lateral tubular section 168 for coupling the body to a conduit, but this need not be provided where the valve is placed within a fuel tank, since a lateral port alone would then suffice. As before, an axially located cable 170 connects an outer breakaway unit 172 to an inner actuating ball 174 which in this case directly abuts against the rear concave seat 176 of a tubular plunger 178. The latter is formed with a peripheral enlargement 180 having a stepped outer surface 181, 182. The former is disposed to hold ball detents 183 projecting outwardly into a locking groove 184 in the housing 168. The ball detents are mounted in radial apertures 186 of longitudinally slidable tubular valve 188. A terminal closure cap 190 having a radially enlarged section 191, is threadedly mounted on the end of the housing 168 so as to seat thereagainst with a sealing ring 192 disposed between the ports.

Within an axial chamber 194 of the cap is a coil compression spring 195 which bears against the end face 196 of valve 188. A cup-shaped resilient sealing closure member 198 is mounted within the spring, enclosing ball 174 and the end of the plunger, member 198 having an inner bead 200 seated in a peripheral groove 202 of the plunger, with its adjacent annular neck 201 snugly engaging the radially restricted terminal portion 203 of the plunger. A compression spring 204 is seated about a forward, radially restricted section 206 of the plunger, within a central cavity 208 of the valve so as to bear against shoulder 210 of the valve and shoulder 211 of the plunger and thus urge the plunger and valve member in opposite directions. Such movement is limited by a split ring 212 carried by the plunger.

With the construction described a pull on cable 170 and attached trigger ball 174, sufficient to overcome the force of spring 204 is effective to move the plunger 178 forward a limited distance as permitted by compression of spring 204 so as to allow the projected detent balls 183 to move back from their locking position in the housing groove 184, thus permitting the cable to move the valve and plunger forward to a seated position. In the seated or closed position, the forward edge 214 of the valve member seats against a shoulder 215 in the valve housing and an O ring 216 in a groove 217 of a reduced end 218 of the valve engages a valve seat 220 to close the opening or port. An O ring 222 in the plunger effects a seal between the plunger and the valve member.

Although I have illustrated and described preferred forms of my invention, I contemplate that various changes and modifications can be made therein without departing from the invention, the scope of which is indicated by the following claims.

In the subsequent claims the term "fluid container" embraces both a receptacle and a conduit; hence "a pair of fluid containers" includes either two receptacles, two conduits, or a receptacle and a conduit.

I claim:

1. In a valve assembly of the character described, a fluid container having an aperture, a valve body mounted on said container in the region of said aperture, a valve closure element movably mounted on said body and adapted, when in closed position, to close said aperture, resilient means urging said valve closure element to closed position, releasable lock means normally positively holding said valve closure element in open position, cable means connected to said releasable lock means and extending through said fluid aperture adapted, when pulled, to actuate said releasable lock means and render it ineffective to hold said valve closure element whereby to permit the same to move to closed position.

2. A valve assembly of the character described, comprising a tubular body member formed with inlet and outlet apertures and having attachment means adapted to be connected to a supporting structure adjacent a fluid aperture thereof, a valve closure slidably mounted along said body, said closure and body each being formed with a mutually alignable transverse channel, a detent disposed in said transverse channel and movable between a valve-locking poistion comprising its partial projection into portions of the channels of both closure and body, and a valve-releasing position wherein it is retracted from one of said channels, resilient means for normally positively holding said valve in one position and other resilient means for moving same to the other position, and externally operable cable means for retracting said detent from said first position and overcoming the corresponding resilient means, thereby permitting movement of the valve to the other position.

3. A valve assembly of the character described, comprising a supporting structure having a fluid aperture, valve seat means surrounding said aperture, tubular member formed with attachment means connected to said supporting structure adjacent said fluid aperture thereof; at least one detent carried by said tubular member, a closure carried by said tubular member and adapted selectively to engage said seat and to be retained in unseated position by engagement with said detent, resilient means adapted to seat said valve upon displacement of the detent, and, externally anchorable means including a portion passing through said aperture operable by relative displacement of said supporting structure from such external anchoring position for displacing said detent and thereby seating said valve.

4. A valve assembly of the character described, comprising a tubular body member formed with a peripheral series of lateral apertures individually adapted to receive a detent therein and to allow it to project outward therefrom, a detent disposed in each of said apertures, a mounting flange having a central, tubular section fixedly receiving said tubular body and an annular peripheral section adapted to be mounted on a supporting structure surrounding a fluid aperture thereof, said mounting flange being formed with fluid apertures between said peripheral and tubular section, a transversely severable bellows adapted to serve as a tubular conduit and formed with terminal attachment means at each end, one end of which is connected adjacent said mounting flange and the other end adapted to be coupled adjacent a connected fluid aperture, a valve formed with an axially slidable collar mounted on said tubular body and with an outwardly projecting closure cap adapted selectively to abut against said mounting flange in sealing relation and to be held in a retracted position therefrom by said outwardly projecting detents in registration with said collar, resilient means adapted to seat said valve upon displacement of the detents, resilient means adapted to maintain said detents in registration with said valve collar whereby the valve is normally held open, and a cable attached to said last-mentioned means for rendering the same ineffective, said cable extending through the tubular section of said mounting flange.

5. A valve assembly of the character described, comprising in combination a tubular body member formed with a peripheral series of lateral apertures individually adapted to receive a detent therein and to allow it to project outward therefrom in response to pressure from within the body, a detent disposed in each of said apertures, a mounting flange having a central, tubular section fixedly receiving said tubular body and an annular peripheral section adapted to be connected to a supporting structure surrounding a fluid aperture thereof, said mounting flange being formed with fluid apertures between said peripheral and tubular sections, a valve element formed with an axially slidable collar mounted on said tubular body with a shoulder portion adapted to abut said detents when projecting outwardly of said tubular body; and with an outwardly projecting closure cap adapted selectively to abut against said peripheral section of said mounting flange in sealing relation thereto and to be held in a retracted position therefrom by said outwardly projecting detents disposed in the path of said shoulder portion, resilient means adapted to seat said valve upon displacement of the detents, and externally cancellable means adapted to maintain said detents in engagement with said shoulder of said valve collar whereby the valve is normally held open, said external cancellable means including a generally cylindrical plunger axially slidably mounted within said body member, being formed with an outwardly projecting shoulder adapted to abut against said detents and maintain them in collar-engaging positions, a spring urging said plunger in a direction to hold said detents in outwardly projecting position, and an externally projecting cable secured at one end to said plunger and thus adapted to retract same from said detent-engaging position.

6. The assembly of claim 5 which additionally includes means for externally varying the tension of said last resilient means and accordingly varying the cable tension necessary to overcome same.

7. The assembly of claim 6 wherein the other end of said cable is secured to a structure and the cable is provided with an intermediate section breakable by longitudinal tension of the cable only at a tension greater than that of said last resilient means, whereby said plunger is retracted and the valve seated before possible severance of the cable.

8. The assembly of claim 7 which additionally contains a transversely severable bellows adapted to serve as a tubular conduit and formed with a terminal attachment flange at each end, one of which is connected adjacent the mounting flange and the other adapted to be coupled adjacent a connected fluid aperture, and said cable is disposed within said bellows.

9. In an aircraft, the combination comprising a fluid containing cell mounted in the craft and adapted to resist rupture if torn from a predetermined portion of the craft by a crash, said cell having an opening in one of its walls through which fuel may flow, a valve operable to close said opening, means yieldingly urging said valve toward closed position, releasable holding means normally retaining said valve in open position and actuatable between active and released positions, and automatic actuating means for releasing said holding means and operatively connected to said predetermined portion of the aircraft in a relation to release the holding means and allow closure of the valve in response to crash induced displacement of the cell relative to said predetermined portion of the craft, said holding means when in said active condition being positioned and constructed to resist the valve closing force of said yielding means without transmitting said force to said actuating means, said holding means including a hollow stem projecting from said valve, at least one latch part movably mounted within an aperture in a side wall of said stem, a shoulder engageable by said latch part to hold the valve in open position, and a spring pressed plunger in said stem controlling said latch part and actuable by said actuating means.

10. The combination set forth in claim 9 wherein the aircraft includes another fluid containing cell with an opening in one of its walls through which fuel may flow, and a conduit connected to the openings of said fluid containing cells to permit communication and the flow of fluid therebetween, said conduit operatively connected to said predetermined portion of the aircraft in a relation to break such connection between said fluid containing cells in response to crash induced displacement of said fluid containing cells relative to said predetermined portion of the craft.

11. The combination set forth in claim 9 including means in addition to the already defined structure to permit said valve to be reset in its open position.

12. The combination comprising means forming a fluid passing opening, a valve operable to bridge across and close said opening, means yieldingly urging said valve toward closed position, releasable holding means normally retaining said valve in open position and actuable between active and released positions, and automatic actuating means for releasing said holding means, said holding means when in said active condition being positioned and constructed to resist the valve closing force of said yielding means without transmitting said force to said actuating means, said holding means including a first structure, a second structure carried by said valve and movable therewith between open and closed positions of the valve, one of said structures being hollow, at least one latch part movably receivable at least partially within an aperture in a side wall of said hollow structure, a shoulder carried by the other structure and engageable by said latch part to hold the valve in open position, and a spring pressed plunger in said hollow structure controlling said latch part, said actuating means including externally anchorable means extending from said plunger through said opening to an exterior anchoring location beyond the opening and operable to actuate said plunger and release the valve for closure upon relative movement of said opening forming means and said externally anchorable means.

References Cited by the Examiner

UNITED STATES PATENTS

| 2,547,853 | 4/1951 | Butterfield | 137—65 |
| 2,701,704 | 2/1955 | Lawrence | 251—297 X |
| 2,733,729 | 2/1956 | Wolfe | 251—297 X |
| 2,793,075 | 5/1957 | Gulick | 251—297 X |

FOREIGN PATENTS

| 978,686 | 11/1950 | France. |
| 1,037,010 | 4/1953 | France. |
| 1,179,423 | 12/1958 | France. |

MILTON BUCHLER, *Primary Examiner.*

CARY M. NELSON, *Examiner.*

J. T. DEATON, *Assistant Examiner.*